United States Patent [19]

Tamura et al.

[11] Patent Number: 4,538,294
[45] Date of Patent: Aug. 27, 1985

[54] X-RAY FILM-HOLDING DEVICE WITH CONVEX CUSHION MEMBERS

[75] Inventors: Kaoru Tamura, Utsunomiya; Yoshimasa Ogo, Ootawara, both of Japan

[73] Assignee: Tokyo Shibaura Denki Kabushiki Kaisha, Japan

[21] Appl. No.: 578,884

[22] Filed: Feb. 10, 1984

[30] Foreign Application Priority Data

Feb. 16, 1983 [JP] Japan ................................ 58-22805

[51] Int. Cl.³ .............................................. G03B 11/00
[52] U.S. Cl. ..................................... 378/187; 378/166
[58] Field of Search ............... 378/187, 166, 185, 188; 250/482.1

[56] References Cited

U.S. PATENT DOCUMENTS

| | | | |
|---|---|---|---|
| 3,504,180 | 3/1970 | Tone | 378/187 |
| 4,032,790 | 6/1977 | Nakamura | 378/187 |
| 4,081,686 | 3/1978 | Nieuwehoer | 378/188 |
| 4,081,686 | 3/1978 | Nieuwehoer | 378/188 |
| 4,350,248 | 9/1982 | Bauer | 206/455 |
| 4,350,248 | 9/1982 | Bauer | 206/455 |

FOREIGN PATENT DOCUMENTS

| | | |
|---|---|---|
| 2620883 | 4/1978 | Fed. Rep. of Germany . |
| 2729660 | 5/1980 | Fed. Rep. of Germany . |
| 14277 | 3/1967 | Japan . |
| 14346 | 2/1977 | Japan . |
| 33290 | 8/1980 | Japan . |

Primary Examiner—Richard L. Schilling
Attorney, Agent, or Firm—Finnegan, Henderson, Farabow, Garrett & Dunner

[57] ABSTRACT

Swingable front and back plates are supported by a hinge. Cushion members are pasted individually on the inner surfaces of the front and back plates. The cushion members individually have two-dimensional curved surfaces with the same radius of curvature, and are arranged so that the directions of curvature of their curved surfaces cross substantially at right angles. Intensifying screens curved to match the surfaces of the cushion members are pasted thereon. An X-ray film is sandwiched between the intensifying screens, and the front and back plates are joined together. Thereupon, the region of each cushion member, pressing the X-ray film through its corresponding intensifying screens, extends gradually, moving its center from the hinge side to the free-end side. When the front and back plates are joined together, the X-ray film receives a maximum pressing force from the center of each cushion member. The pressing force decreases with radial distance from the center.

9 Claims, 11 Drawing Figures

FIG. 9
FIG. 10
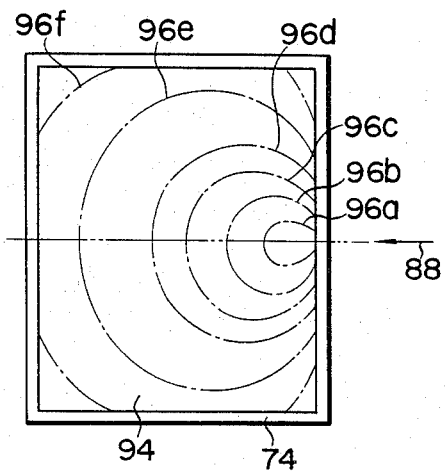
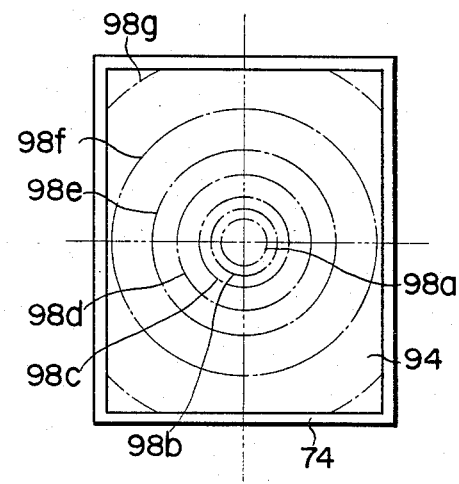
FIG. 11
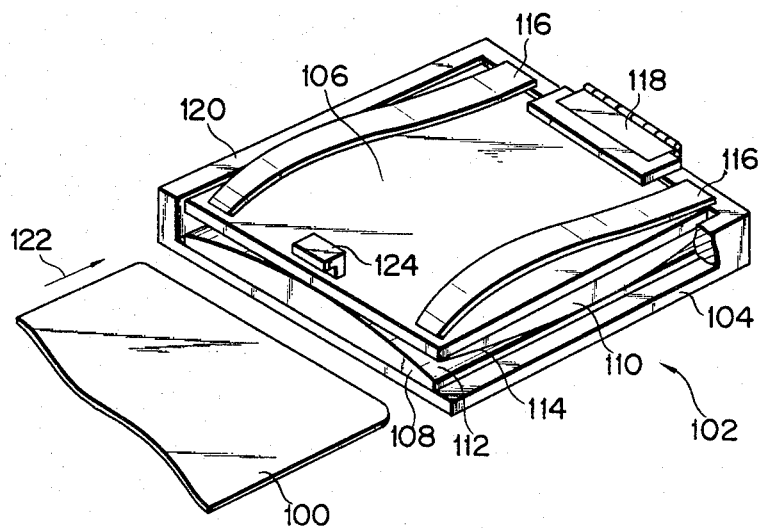

X-RAY FILM-HOLDING DEVICE WITH CONVEX CUSHION MEMBERS

BACKGROUND OF THE INVENTION

The present invention relates to an X-ray film-holding device used in a cassette- or cassetteless-type X-ray photographing apparatus.

In a cassette system, an X-ray film is sandwiched between itensifying screens in a cassette, which is set in a shot position of an X-ray photographing apparatus. In a cassetteless system, on the other hand, X-ray films are taken out one by one from an unexposed film magazine, fed to a fastening device, and sandwiched between fastening plates of the fastening device in a manner such that a intensifying screen is put on each surface of each X-ray film. The fastening device travels to a shot position where an X-ray is exposed. In these prior art systems, the X-ray film is held in the cassette or fastening device with the intensifying screen sheet on each surface thereof.

For example, in a cassette-type X-ray photographing apparatus, a cassette 10 has a front plate 14 and a back plate 16 supported so as to be swingable in the directions indicated by an arrow 12, as shown in FIG. 1. One of the respective peripheral edges 18 and 20 of the front and back plates 14 and 16 is in the form of a groove, while the other is in the form of a projection. Thus, when the front and back plates 14 and 16 are joined together, the peripheral edges 18 and 20 are interlocked to prevent external light from coming into the cassette 10. The front and back plates 14 and 16 are fixed by means of metal fittings 22. A flat cushion member 24, made of sponge or felt, is fixed to the inner surface of each of the front and back plates 14 and 16. A intensifying screen 26 is pasted on each cushion member 24. An X-ray film 28 is placed between the intensifying screens 26. When the front and back plates 14 and 16 are joined together, the X-ray film 28 is sandwiched between the two plates 14 and 16 in a manner such that the intensifying screens 26 are pressed against their corresponding sides of the X-ray film 28 by the elastic force of the cushion members 24.

In this case, the cushion members 24 are flat, so that air may possibly remain between the X-ray film 28 and the intensifying screens 26 when the front and back plates 14 and 16 are joined together. In any air layer exists between the X-ray film 28 and the intensifying screens 26, the intensifying screens 26 will unevenly affect the whole surface of the X-ray film 28, and the gap between the X-ray film 28 and the intensifying screens 26, attributed to the existence of the remaining air, will produce an indistinct or blurred image. This will make diagnosis to be difficult.

Various methods are proposed to prevent air from remaining between the X-ray film and the intensifying screens. FIG. 2 is a side-sectional view showing a cassette 30 which is disclosed in Japanese Patent Publication No. 14277/70. Swingable front and back plates 32 and 34 of cassette 30 are supported by a hinge 36. A cushion plate 38 and a intensifying screen 40 are pasted on each of the front and back plates 32 and 34. An X-ray film 42 is interposed between the intensifying screens 40. The front and back plates 32 and 34 are formed on an elastic material and curved so that the distance between them is greater the further they are from the hinge 36.

Thus, as the front and back plates 32 and 34 are joined together, front end edges 44 of the contact surfaces between the X-ray film 42 and the intensifying screens 40 advance in the direction indicated by an arrow 46, as shown in FIG. 3. As a result, air is pushed forward and out from the front end edges 44 of the contact surfaces. In this cassette 30, however, an air layer 48 is liable to be produced in the central portion thereof. When the front and back plates 32 and 34 are joined together, moreover, the force of these plates 32 and 34 pressing the X-ray film 42 is even in the direction along the front end edges 44 of the contact surfaces, but is uneven in the direction of the arrow 46. In particular, in the region corresponding to the air layer 48, the front and back plates 32 and 34 are bent with maximum curvature and pressure is reduced against the X-ray film 42. If the pressure on the X-ray film 42 is uneven, the image obtained may possibly be uneven. Further, the joining of the curved front and back plates 32 and 34 requires great force.

FIGS. 4 to 6 show a cassette 50 which is disclosed in Japanese Utility Model Publication No. 33290/80. Swingable front and back plates 52 and 54 of cassette 50 are supported by hinges 56. As shown in FIG. 6, the front plate 52 is flat, and is pasted with a intensifying screen 58 on its inner surface. As shown in the vertical sectional view of FIG. 5, the central portion of the back plate 54 is protuberant. Namely, the back plate 54 has elliptic contour lines 64, indicated by dashed lines in FIG. 4, providing a maximum height y in the center. A cushion member 60 is pasted on the inner surface of the back plate 54, and a intensifying screen 58 is pasted on the cushion member 60. When the back plate 54 is swung down after placing an X-ray film 62 on another intensifying screen 58 on the front plate 52, the intensifying screen 58 on the back plate 54 comes steadily into contact with the X-ray film 62, starting from the region corresponding to the center of the back plate 54. Thus, the two intensifying screens 58 are brought closely into contact with the X-ray film 62 without leaving any air layer between them.

The back plate 54 is usually formed of an aluminum plate. It is difficult, however, to process an aluminum plate into a three-dimensional curved surface having elliptic contour lines. Since the intensifying screens 58 are rigid, they cannot easily be bent in conformity with the three-dimensional curved surfaces. Thus, it is hard to bring the X-ray film 62 uniformly into contact with the intensifying screen 58 on the back plate 54. Also in this cassette 50, the joining of the front plate 52 and the curved back plate 54 requires great force.

SUMMARY OF THE INVENTION

The object of the present invention is to provide an X-ray film-holding device capable of bringing X-ray film into close contact with the entire surface of intensifying screens without leaving any air layers between them, thereby ensuring production of a high-quality X-ray image.

According to the present invention, there is provided an X-ray film holding device for holding an X-ray film, which comprises a front plate and a back plate permeable to X-rays, supporting means for supporting the front and back plates so the two plates can be fixed in an overlapping relation, cushion members on the front and back plate sides fixed to opposed faces of the front and back plates, the front- and back-plate-side-cushion members having front- and back-plate-side convex surfaces curved in first and second directions, respectively, and arranged so the first and second directions substantially cross at right angles, and intensifying screens on the front and back plate sides fixed to and curved along the front- and back-plate-side convex surfaces.

The X-ray film is held between the front- and back-plate-side intensifying screens by the elastic force of the front- and back-plate-side cushion members. As the front and back plates are joined together, the regions of the front- and back-plate-side members press the X-ray film through the intensifying screens extend outward, forcing out the air between them. When the front and back plates are joined together, contour lines, the pressing force of the cushion members against the X-ray films, are concentrically located on the cushion members. The X-ray film receives a maximum pressing force from the centers of the cushion members, and the pressing force decreases with distance from the centers. Thus, the intensifying screens and the X-ray film can be brought closely into contact over the entire surface without leaving any air layers between them. This permits the production of a high-quality X-ray image.

Since the cushion members are formed of an elastic material such as urethane foam, the curved surfaces are easy to form. Since the cushion members are two-dimensional curved surfaces that are curved in the first and second directions, the intensifying screens can easily be formed into curved sheets to match the curved surfaces. Thus, the intensifying screens can be brought uniformly into contact with the X-ray film. The force required in joining the front and back plates is relatively small. Namely, the front and back plates can be joined with ease.

BRIEF DESCRIPTION OF THE DRAWINGS

FIG. 9 is a diagram showing a movement of the end edges of the contact surfaces provided by the device in FIG. 7;

FIG. 10 is a diagram showing the stress distribution applied to an X-ray film; and FIG. 11 is a perspective view showing an X-ray film-holding device according to a second embodiment of the invention applied to a cassetteless-type film fastening device.

DETAILED DESCRIPTION OF THE PREFERRED EMBODIMENT

Figure 1:
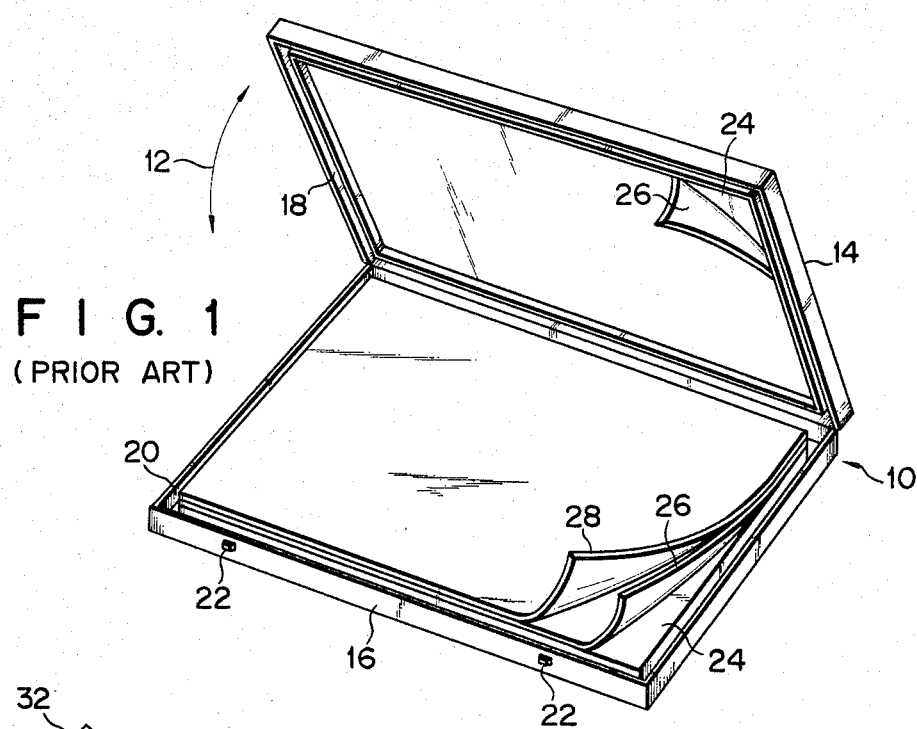
FIG. 1 is a perspective view showing a first prior art cassette.
Figure 2:
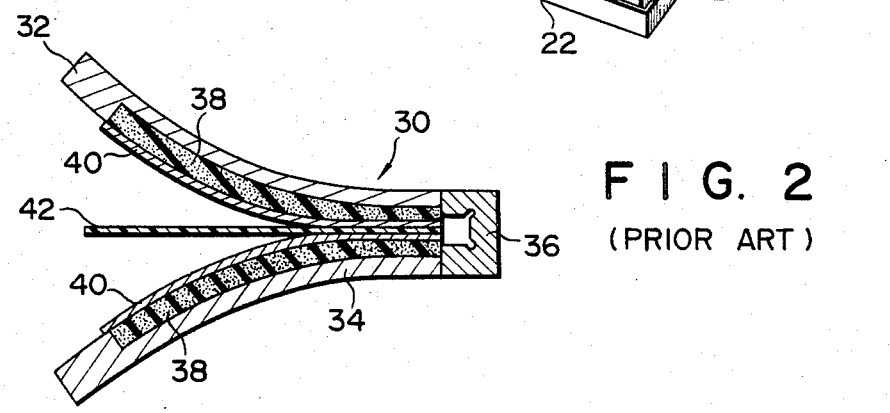
FIG. 2 is a side-sectional view showing a second prior art cassette.
Figure 3:
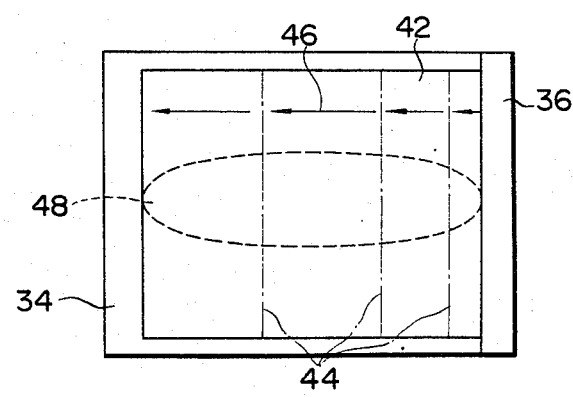
FIG. 3 is a diagram showing a movement of the front end edges of contact surfaces.
Figure 4:
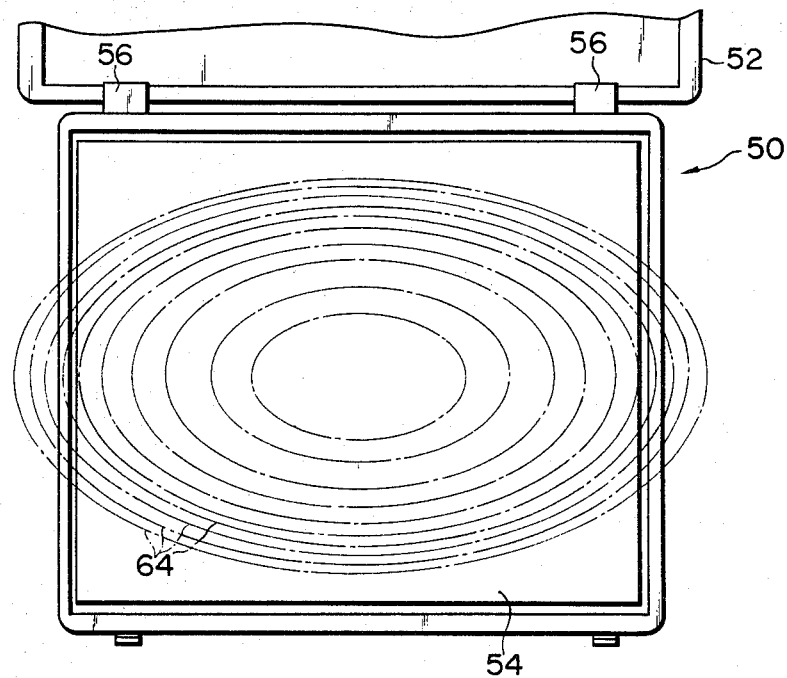
FIG. 4 is a plan view showing a third prior art cassette.
Figure 5:
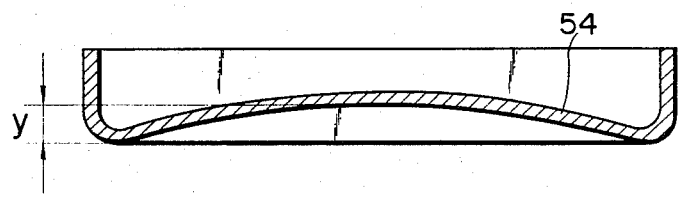
FIG. 5 is a vertical sectional view taken along the center line of the back plate of the cassette in FIG. 4.
Figure 6:
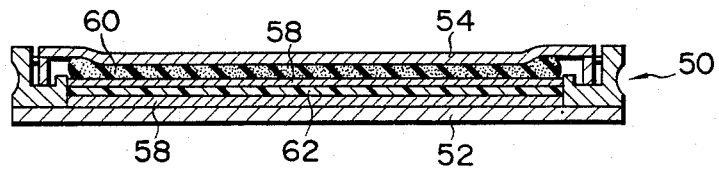
FIG. 6 is a vertical sectional view of the cassette in FIG. 4 loaded with an X-ray film.
Figure 7:
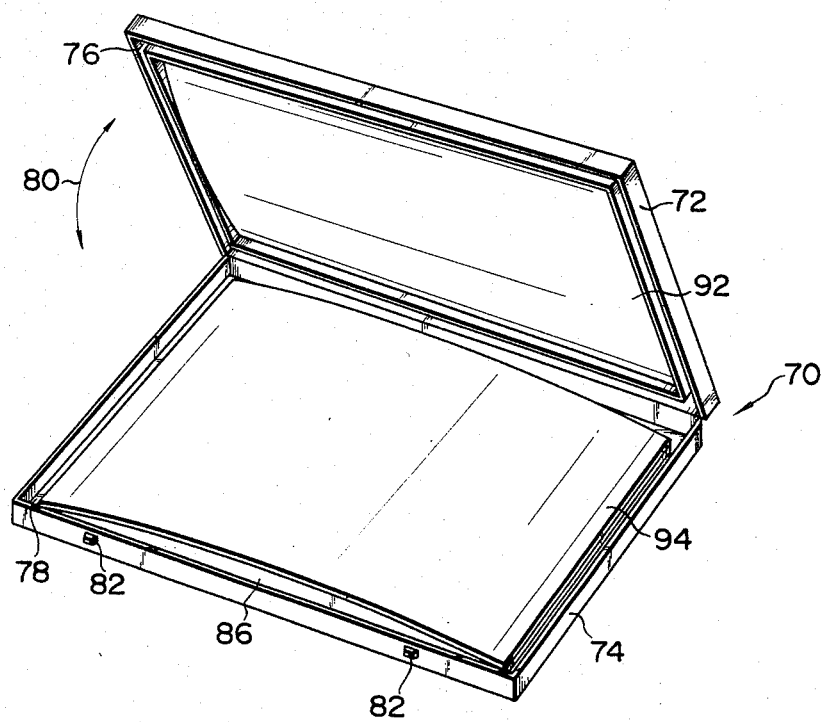
FIG. 7 is a perspective view showing an X-ray film-holding device according to a first embodiment of the present invention applied to a cassette.
Figure 8:
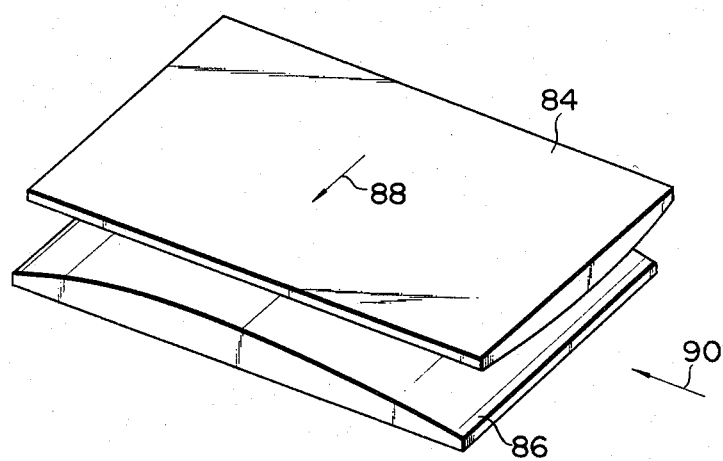
FIG. 8 is a perspective view of cushion members of the device in FIG. 7.

FIGS. 7 and 8 show a cassette 70 according to a first embodiment of the present invention. The cassette 70 has a front plate 72 and a back plate 74 of a material permeable to X-rays and support each other by a hinge (not shown) so as to be swingable in the directions indicated by an arrow 80. One of the respective peripheral edges 76 and 78 of the front and back plates 72 and 74 is in the form of a groove, while the other forms a projection to engage the groove. Thus, when the front and back plates 72 and 74 are joined together, the peripheral edges 76 and 78 are interlocked to prevent external light from coming into the cassette 70. The front and back plates 72 and 74 are fixed by means of metal fittings 82.

Cushion members 84 and 86 are pasted on the inner surfaces of the front and back plates 72 and 74. That surface of cushion member 84 which fases cushion member 86 has a certain radius of curvature, the direction arrow 88, which is at right angles to the pivot of the front and back plates 72 and 74. On the other hand, that surface of cushion member 86 which faces the cushion member 84 is curved with the same curvature as cushion member 84 along the pivot of the front and back plates 72 and 74 or in the direction indicated by arrow 90. Thus, the directions of curvature of the two opposite surfaces cross at right angles. The cushion members 84 and 86 are each formed of an elastic material, such as urethane foam, sponge or felt, so that one surface of the material is curved. In this case, urethane foam is the best material for cushion members 84 and 86, as it has elasticity, is easily worked, and has a high deformation rate, etc. The radius of curvature of the surfaces of the cushion members 84 and 86 is suitably determined by the elastic force, deformation rate and other characteristics of the elastic material used and the size of the X-ray film. If the cushion members 84 and 86 are formed from urethane foam and if the X-ray film is of a quarter size (10 in. × 12 in.), the radius R of curvature of the cushion members 84 and 86 is set between, e.g., 3,500 mm and 4,500 mm. If the radius R of curvature is 3,750 mm, the length of one side edge of each cushion member 84 or 86 is 300 mm long, the thickness of the central portion is 6 mm, the thickness of the side edge is 3 mm, and the height of the central projection is 3 mm. Intensifying screens 92 and 94, curved along the curved surfaces of the cushion members 84 and 86, respectively, are pasted thereon. An X-ray film is sandwiched between the intensifying screens 92 and 94.

The operation of the cassette 70 with the aforementioned construction will now be described. As shown in FIG. 7, the front plate 72 is swung open, the X-ray film is put on the sensitizing sheet 94 on the back plate 74, and then the front plate 72 is swung down. As the front plate 72 is swung down, that region of the X-ray film to which the pressing force of the cushion members 84 and 86 is applied extends in the manner indicated by regions 96a, 96b, 96c, 96d, 96e and 96f, defined by individual broken lines in FIG. 9. Thus, the pressure-contact region between the X-ray film and each intensifying screen 92 or 94 is substantially circular and radially extends with its center moving in the direction of the arrow 88. In consequence, the intensifying screens 92 and 94 are kept in contact with the X-ray film while forcing out the air between them. Consequently, when the front plate 72 is swung down to close the cassette 70, there will be no air layers remaining between the X-ray film and the intensifying screens 92 and 94. When the front and back plates 72 and 74 are fully joined together, they are fixed by means of the metal fittings 82. In this case, the cushion members 84 and 86 apply the greatest pressing force to the central portion of the X-ray film and smaller forces to the peripheral portion, indicated by contour lines (dashed lines) 98a, 98b, 98c, 98d, 98e, 98f and 98g in FIG. 10. These contour lines 98a to 98g are substantially circular and are arranged concentrically around the centers of the cushion members 84 and 86. The pressing forces are lowered from contour line 98a toward line 98g. Therefore, air encountered by an outward force from the centers of the cushion members 84 and 86, is prevented from forcing itself between the X-ray film and the intensifying screens 92 and 94. Thus, the X-ray film and the intensifying screens 92 and 94 are brought uniformly into close contact, ensuring production of a high-quality X-ray image.

The curved surfaces of the cushion members 84 and 86 can easily be formed or worked. Each of the intensifying screens 92 and 94 can easily be formed into a curved sheet, matching the curved surface of the cushion member 84 or 86, by simply shaping it into a two-dimensional surface curved in one direction (direction of the arrow 88 or 90). The force required in joining the front and back plates 72 and 74 is relatively small. In other words, the front and back plates 72 and 74 can be joined with ease.

FIG. 11 shows a film fastening device 102, used in a cassetteless-type spot-shot apparatus, according to a second embodiment of the invention. Cassetteless-type spot-shot apparatuses have recently start to be widely used in the field or medical X-ray diagnostic table. In the spot-shot apparatus, according to this embodiment, a plurality of unexposed films 100 (50 to 100 in number) are stored in a pile in an unexposed film magazine (not shown). The X-ray films 100 are taken out one by one from the magazine and fed to the film fastening device 102. The film fastening device 102 holds each X-ray film 100. The fastening device 102 travels to a shot position where an X-ray is exposed. Then, the fastening device 102 returns to its original position where it releases the exposed X-ray film 100. The X-ray film 100 is delivered to an exposed film magazine (not shown) to be stored therein. In the cassetteless-type spot-shot apparatus, this series of operations is repeated automatically.

The film fastening device 102 has a front plate 104, which is provided with a reinforcing rib 120 extending along three sides thereof. A back plate 106, fitted in the space defined by the rib 120, is rotatably supported on the central portion of the rib 120 by a hinge 118. A hooked metal fitting 124 is fixed on the top surface of the free-end portion of the back plate 106. The back plate 106 is urged toward the front plate 104 by a pair of elastic strips 116. A pair of cushion members 108 and 110, similar to the cushion members 84 and 86, are pasted on the opposed faces of the front and back plates 104 and 106, respectively. Intensifying screens 112 and 114, similar to intensifying screens 92 and 94, are pasted on curved surfaces of the cushion members 108 and 110, respectively. The directions of curvature of the cushion members 108 and 110 cross at right angles.

In the fastening device 102, constructed in this manner, the X-ray film 100 is fed in the direction indicated by arrow 122. A hook (not shown) engages the metal fitting 124 to raise the same. Thereupon, the back plate 106 is swung open, and the X-ray film 100 is carried onto the intensifying screen 112 on the front plate 104. Then, the hook is lowered to swing down the back plate 106 and is disengaged from the metal fitting 124. Thus, the X-ray film 100 is sandwiched between the intensifying screens 112 and 114. Also, in this case, the pressure-contact region changes like in the manner shown in FIG. 9 as the back plate 106 is swung down. The distribution of pressure applied after the fastening device 102 is closed is same as that shown in FIG. 10. The fastening device 102 holding the X-ray film 100 moves to the shot position.

In the embodiments described above, the front and back plates are supported by a swing hinge. Alternatively, however, the front and back plates may be designed so that they are joined and separated in a straight manner. The directions of curvature of the cushion members, relative to the front and back plates, need not always be set in the manner described in connection with the above embodiments. It is necessary only that the directions of curvature of the front- and back-plate-side cushion members cross substantially at right angles. The radius of curvature of the front-plate-side cushion member may be made different from that of the back-plate-side cushion member. Each surface need not always be curved along the circumference of a circle. It may alternatively be curved along the circumference of, e.g., an ellipse.

What is claimed is:

1. An X-ray film-holding device for holding an X-ray film, comprising:
   a front plate and a back plate permeable to X-rays;
   supporting means for supporting the front and back plates so that the two plates can be fixed in overlapping relation;
   cushion members on the front and back plate sides fixed to opposite faces of the front and back plates, said front- and back-plate-side cushion members having front- and back-plate-side convex surfaces curved in first and second directions, and arranged so that the first and second directions cross each other; and
   intensifying screens on the front and back plate sides fixed to and curved along the front- and back-plate-side convex surfaces,
   said X-ray film being held between the front- and back-plate-side intensifying screens by the elastic force of the front- and back-plate-side cushion members.

2. The X-ray film-holding device, according to claim 1, wherein said front- and back-plate-side convex surfaces are each curved along the circumference of a circle.

3. The X-ray film-holding device, according to claim 2, wherein said front- and back-plate-side convex surfaces have the same radius of curvature.

4. The X-ray film-holding device, according to claim 3, wherein said front- and back-plate-side cushion members are formed of urethane foam.

5. The X-ray film-holding device, according to claim 4, wherein said X-ray film measures ten inches by twelve, and the radius of curvature of said front- and back-plate-side convex surfaces ranges from 3,500 mm to 4,500 mm.

6. The X-ray film-holding device, according to claim 1, wherein said supporting means includes a swing hinge supporting the front and back plates, and lock means provided on the opposite sides of the front and back plates to the hinge and adapted to fix the front and back plates in closed relation.

7. The X-ray film-holding device, according to claim 6, wherein said X-ray film-holding device is applied to a cassette.

8. The X-ray film-holding device, according to claim 1, wherein said supporting means includes a swing hinge supporting the front and back plates, and an elastic member for urging one of the front and back plates toward the other.

9. The X-ray film-holding device, according to claim 8, wherein said X-ray film-holding device is applied to a fastening device of a cassetteless-type spot-shot apparatus.

* * * * *